(12) United States Patent
Porte

(10) Patent No.: US 6,334,588 B1
(45) Date of Patent: Jan. 1, 2002

(54) AIRCRAFT PROPULSION UNIT FAN COWLS EQUIPPED WITH MAINTAINING AND POSITIONING SAFETY ELEMENTS

(75) Inventor: Alain Porte, Colomiers (FR)

(73) Assignee: Aerispatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/341,573

(22) PCT Filed: Dec. 14, 1998

(86) PCT No.: PCT/FR98/02718

§ 371 Date: Aug. 2, 1999

§ 102(e) Date: Aug. 2, 1999

(87) PCT Pub. No.: WO99/30969

PCT Pub. Date: Jun. 24, 1999

(30) Foreign Application Priority Data

Dec. 16, 1997 (FR) ............................................. 97 15930

(51) Int. Cl.$^7$ ................................................. B64C 1/14
(52) U.S. Cl. .................................................... 244/129.4
(58) Field of Search .............................. 244/53 R, 54, 244/129.4; 292/87, 101, 162

(56) References Cited

U.S. PATENT DOCUMENTS

| 4,365,775 A | * | 12/1982 | Glancy |
| 4,613,099 A | * | 9/1986 | Smith et al. |
| 4,629,146 A | * | 12/1986 | Lymons |
| 4,679,750 A | * | 7/1987 | Burhans |
| 5,603,471 A | * | 2/1997 | Armstrong |
| 5,941,061 A | * | 8/1999 | Sherry et al. |
| 6,032,901 A | * | 3/2000 | Carimali et al. ...................... |

* cited by examiner

Primary Examiner—Charles T. Jordan
Assistant Examiner—Tien Dinh
(74) Attorney, Agent, or Firm—Burns Doane Swecker & Mathis

(57) ABSTRACT

In an aircraft propulsion system, such as a jet engine, the fan cowls (22) are articulated to the support strut or pylon (12) by which the centre or core engine (14) is connected to a wing element (10). The cowls (22) are kept closed by hooked locks (32a, 32b), which connect their lower edges. To eliminate any risk of accidental opening, guide devices (36, 38) are placed between the lower edges of the cowls (22) and structures (20; 24, 26) connected to the centre engine (14), at least at the front of the cowls. The front structure (20) opposes any axial and radial displacement of the cowls.

13 Claims, 8 Drawing Sheets

AIRCRAFT PROPULSION UNIT FAN COWLS EQUIPPED WITH MAINTAINING AND POSITIONING SAFETY ELEMENTS

TECHNICAL FIELD

The invention relates to a propulsion system, such as a jet engine, for equipping an aircraft.

More specifically, the invention relates to a propulsion system comprising a centre or core engine, a pod placed around the engine in accordance with a common longitudinal axis, as well as a support strut or pylon by which the engine is connected to a structural element of the aircraft. This structural element can either be a wing element when the propulsion system is installed beneath the wing, or a rear element of the fuselage, when the propulsion system is installed laterally at the rear of the fuselage.

The invention is applicable to any propulsion system of this type, in which access to the engine equipments takes place by opening two cowls, having a C-shaped cross-section, which form an integral part of the pod and are articulated directly or indirectly to the strut supporting the engine.

PRIOR ART

As is diagrammatically illustrated in FIG. 1, in an aircraft propulsion system such as a turbofan engine, maintenance generally takes place by means of two pivoting cowls 1 forming an integral part of the pod 2. These cowls 1 are intercalated between an air intake structure 3, forming the front of the pod 2 in the air flow direction, and a rear part 4 of the pod, in which in general thrust reversers are located. The cowls 1 are articulated to the strut 5 either directly, or by means of fixed parts belonging to the pod 2.

The strut 5 is generally a beam for connecting the centre engine 6 to an aircraft wing element. The cowls 1 are then articulated to the strut by their upper edges.

In certain, rarer cases, the strut 5 is a lateral beam for connecting the centre engine 6 to the rear of the aircraft fuselage. The cowls 1 are then articulated to the strut by one of their lateral edges.

The opening of these cowls 1 makes it possible to ensure the maintenance of equipments of the engine 6. When closed, the cowls 1 ensure the continuity of the external aerodynamic shapes of the pod 2.

The cowls 1 are closed by not shown locking means, which connect the connecting edges of the cowls, opposite to those by which they are articulated to the strut 5. Thus, these locking means connect the lower edges of the cowls 1, when the propulsion system is placed beneath the wing of an aircraft.

In practice, the locking means are generally constituted by several hooked locks distributed along the connecting edges. Each lock comprises a hook installed on one of the cowls 1 and a fork carried by the other cowl 1. The hooks are installed on one of the cowls in a pivoting manner, so as to cover the facing forks, when the locks are in the locked state. In this locked state, the locks exert a tension between the two cowls. This tension, which is applied in a circumferential direction with respect to the longitudinal axis of the propulsion system is known as the "belt tension".

When the cowls are in the closed position, their front and rear edges surround two circular bearing surfaces of limited length and large diameter. One 7 of these bearing surfaces is formed at the rear of the air intake structure 3 of the pod 2. The second bearing surface 8 is formed at the front of the rear part 4 of the pod.

Theoretically, the belt stress exerted by the locks on the cowls should constantly maintain the latter in bearing action over the entire periphery of the bearing surfaces 7, 8, by applying thereto a circumferential load.

In practice and as illustrated by FIGS. 2 and 3, the application of the circumferential load is reduced or even prevented by the bending of the engine 6 and the air intake structure 3 under their own weight, when the aircraft is on the ground.

In order to avoid their disassembly on removing the engine 6, the cowls 1 are articulated to the strut 5 and not directly to the engine. Therefore the cowls 1 are independent of small amplitude movements of the engine 6. Due to the fact that the different structures forming the propulsion system have a certain flexibility, which tends to increase over the years, all these structures bow under their own weight when the aircraft is on the ground. As is diagrammatically illustrated in FIGS. 2 and 3, the front of the engine 6 and the air intake structure 3 fixed to the latter then occupy a low position with respect to the cowls 1. The circumferential bearing area between the air intake structure 3 and the front edges of the cowls is then located in the lower part of the propulsion system. There is consequently a difference or variation J1 (FIG. 3) between the upper edge of each of the cowls 1 and the external envelope of the air intake structure 3.

When the aircraft is flying, the engine 6 and the air intake structure 3 are again in a higher position under the effect of thrust and aerodynamic forces, as illustrated in FIG. 4. The circular bearing surface 7 formed on the air intake structure 3 then abuts on the upper part of the front edges of the cowls 1. In view of the fact that the latter are not directly connected either to the engine 6, or to the air intake structure 3, they are unable to follow this vertical, upward displacement of the air intake structure. Thus, in the lower part, there is a mismatching between the front edges of the cowls 1 and the circular bearing surface 7 formed on the air intake structure 3. This mismatching, which has been deliberately exaggerated in FIG. 4, is designated in the latter by the reference J2.

When the mismatching J2 is limited, it gives rise to a significant erosion of the front edges of the cowls 1, in the upper part of the latter when the aircraft is on the ground and in their lower part when the aircraft is flying. In the case of a more pronounced mismatching J2, in flight there is an intake of air disturbing the ventilation of the internal area of the cowls 1.

Finally, in the case of a considerable mismatching J2, of e.g. approximately 1 cm, the intake of air has the effect of pressurizing the inner faces of the cowls 1, which can lead to the loss thereof, if one of the locks is poorly set or locked.

Moreover, the integrity of the locking function requires that the two parts of each lock, i.e. the hook connected to one of the cowls 1 and the fork connected to the other cowl, are permanently in contact. If this condition is not satisfied, there is a danger of the hook becoming disconnected. This risk more particularly occurs when there is an excessive clearance between the hook and the fork. In the presence of the mismatching J2 (FIG. 4), the vibrations of the engine 6 and the miscellaneous, relative movements can consequently disconnect the hooks, thereby casting into doubt once again the integrity of the locking function which they fulfil.

DESCRIPTION OF THE INVENTION

The invention specifically relates to an aircraft propulsion system, such as a jet engine, whose original design makes it possible to eliminate all the disadvantages of the prior art and which have been described hereinbefore and more particularly the appearance of a radial clearance between the lower part of the cowls and the air intake structure when the aircraft is flying, so as to avoid accelerated erosion of the leading edge of the cowls and a risk of the latter being accidentally torn away due to the disconnection of the hooked locks.

According to the invention, this result is achieved by means of an aircraft propulsion system, comprising an engine, a pod placed round the engine in accordance with a common longitudinal axis, and a strut supporting the engine, the pod including two cowls having a C-shaped cross-section, articulated to the strut and which can be connected to one another, in the closed position, by locking means, characterized in that front guide means are interposed between the cowls and the part carried by the engine or by an air intake structure of the pod, in the vicinity of the locking means and a front edge of the cowls, so as to oppose a relative displacement between the cowls and the engine, axially and radially with respect to said longitudinal axis, when the cowls are in the closed position.

In a preferred embodiment of the invention, the front guide means comprise at least one front thrust bearing integral with the part carried by the engine or by the air intake structure and a front guide integral with each of the cowls. Each of the front guides then automatically cooperates with the front thrust bearing when the cowls are in the closed position.

In this case, as a function of the particular case, the front guide means can comprise either a single, front thrust bearing, or two front thrust bearings, each of the front guides then cooperating with one of said thrust bearings when the cowls are in the closed position.

In the preferred embodiment of the invention, the front thrust bearing is advantageously fixed to a circular collar and to a radial flange materializing the rear end of the air intake structure of the pod.

An adjustment of the position of the front thrust bearing can then be interposing radial and axial adjusting shims respectively between the front thrust bearing and the circular collar and between the front thrust bearing and the radial flange.

Advantageously, when the locking means are not locked, the front guide means maintain the cowls in a natural position, substantially differing from the closed position, in which the adjacent edges of the cowls are spaced from one another in a visible manner. This arrangement makes it very easy for personnel carrying out maintenance to visually check that the locking means are indeed locked.

The natural position of the cowls permitting said visual check can be defined by a contact by gravity between each of the front guides and the front thrust bearing, so that a passage into the closed position requires the application of a circumferential force between the cowls by the locking means.

In the preferred embodiment of the invention, rear guide means are also interposed between the cowls and a second part carried by the engine or by a rear part of the pod, in the vicinity of the locking means of a rear edge of the cowls, so as to oppose a relative displacement between the cowls and the engine, radially with respect to the longitudinal axis of the engine, when the cowls are in the closed position.

In this case, the rear guide means advantageously comprise a rear thrust bearing integral with the second part carried by the engine or the rear part of the pod, and a rear guide integral with each of the cowls, each rear guide automatically cooperating with the rear thrust bearing when the locking means are in the closed position.

The rear thrust bearing can be fixed to a second circular collar and to a second flange, materializing a front end of the rear part of the pod.

As a variant, the rear thrust bearing can also be fixed directly to the engine.

BRIEF DESCRIPTION OF THE DRAWINGS

The invention is described in greater detail hereinafter relative to a non-limitative embodiment and the attached drawings, wherein show.

DETAILED DESCRIPTION OF A PREFERRED EMBODIMENT OF THE INVENTION

Figure 1:
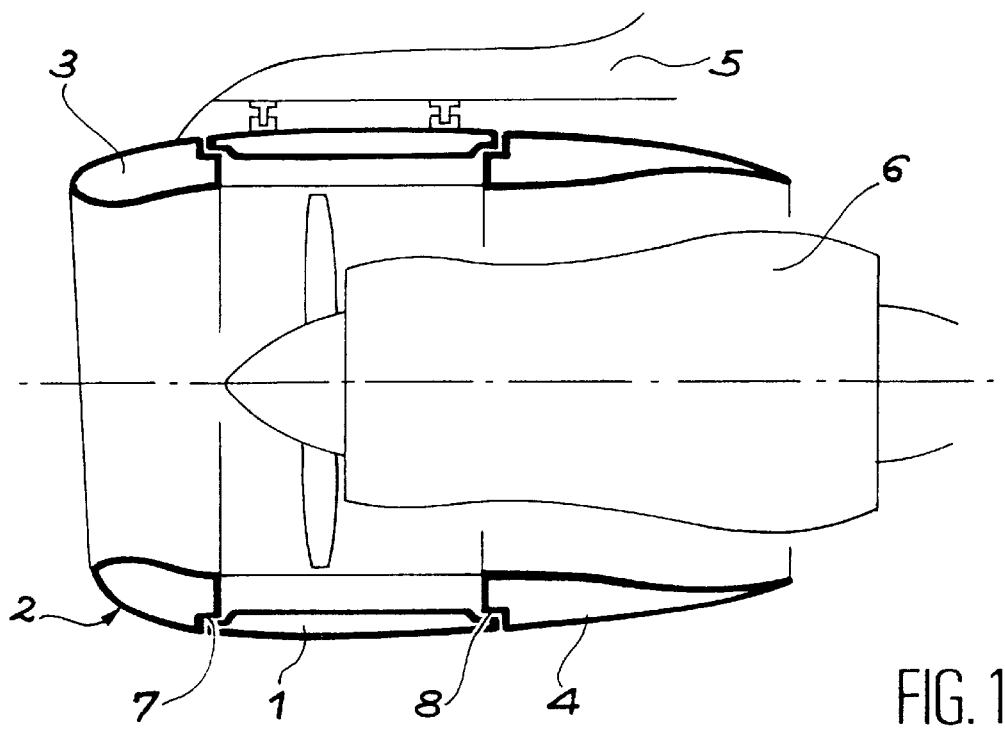
FIG. 1, already described, a diagrammatic, longitudinal sectional view of a conventional propulsion system, in its theoretical, undeformed state.
Figure 2:
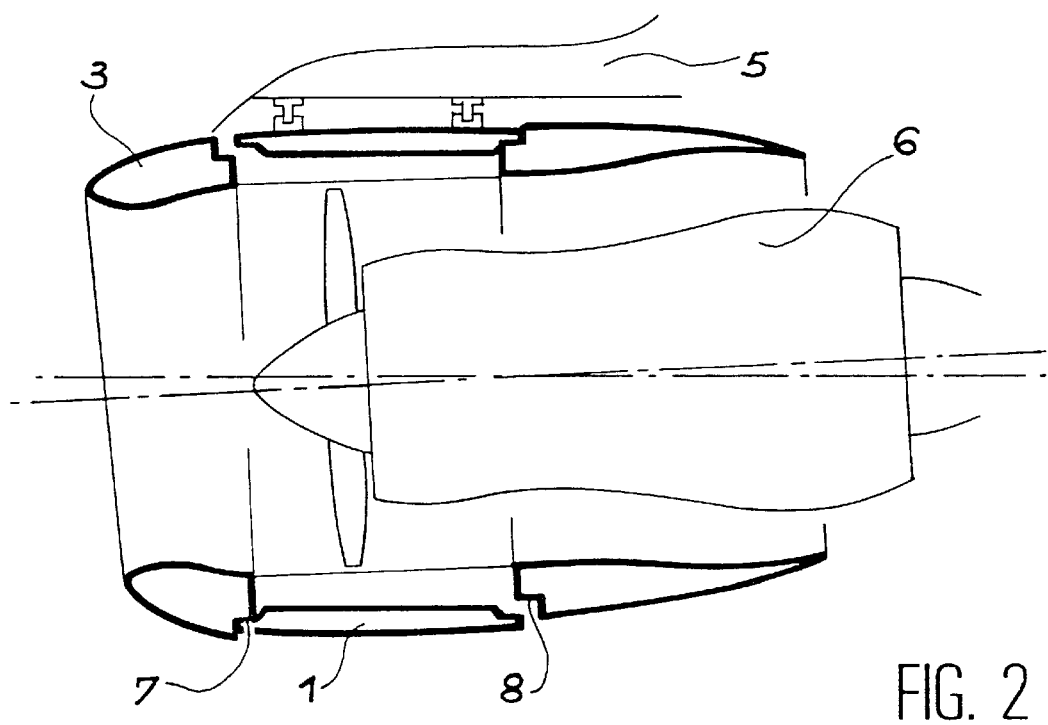
FIG. 2, already described, a diagrammatic sectional view comparable to FIG. 1 showing in deliberately exaggerated manner the real state of the propulsion system when the aircraft is on the ground.
Figure 3:
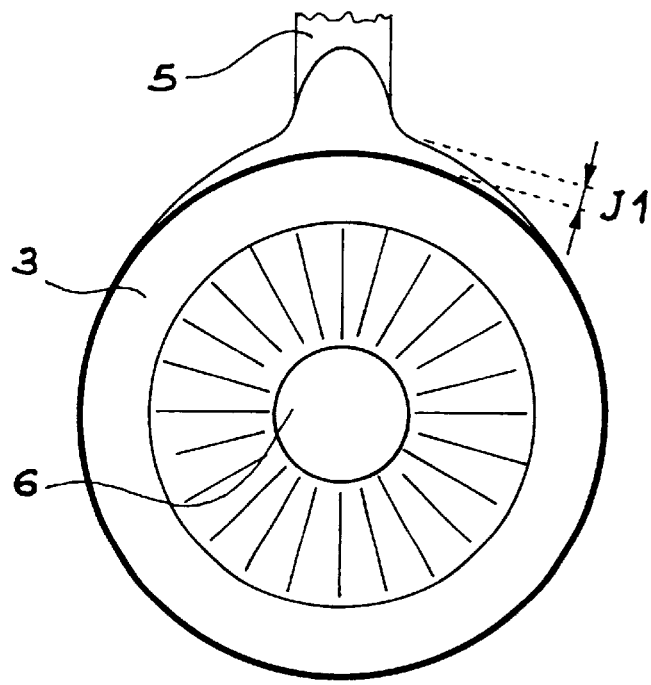
FIG. 3, already described, a front view of a known propulsion system, in the same state as in FIG. 2 with the aircraft on the ground.
Figure 4:
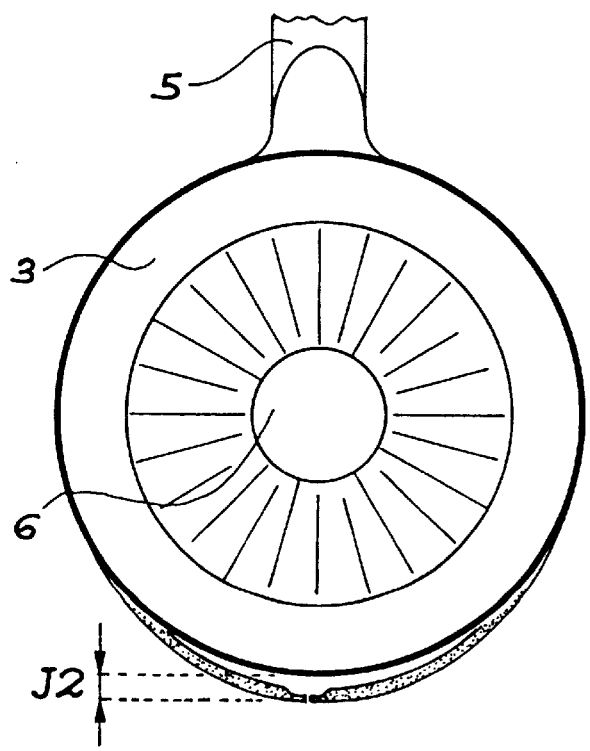
FIG. 4, already described, a front view comparable to FIG. 3, showing the propulsion system in the state which it occupies when the aircraft is in flight.
Figure 5:
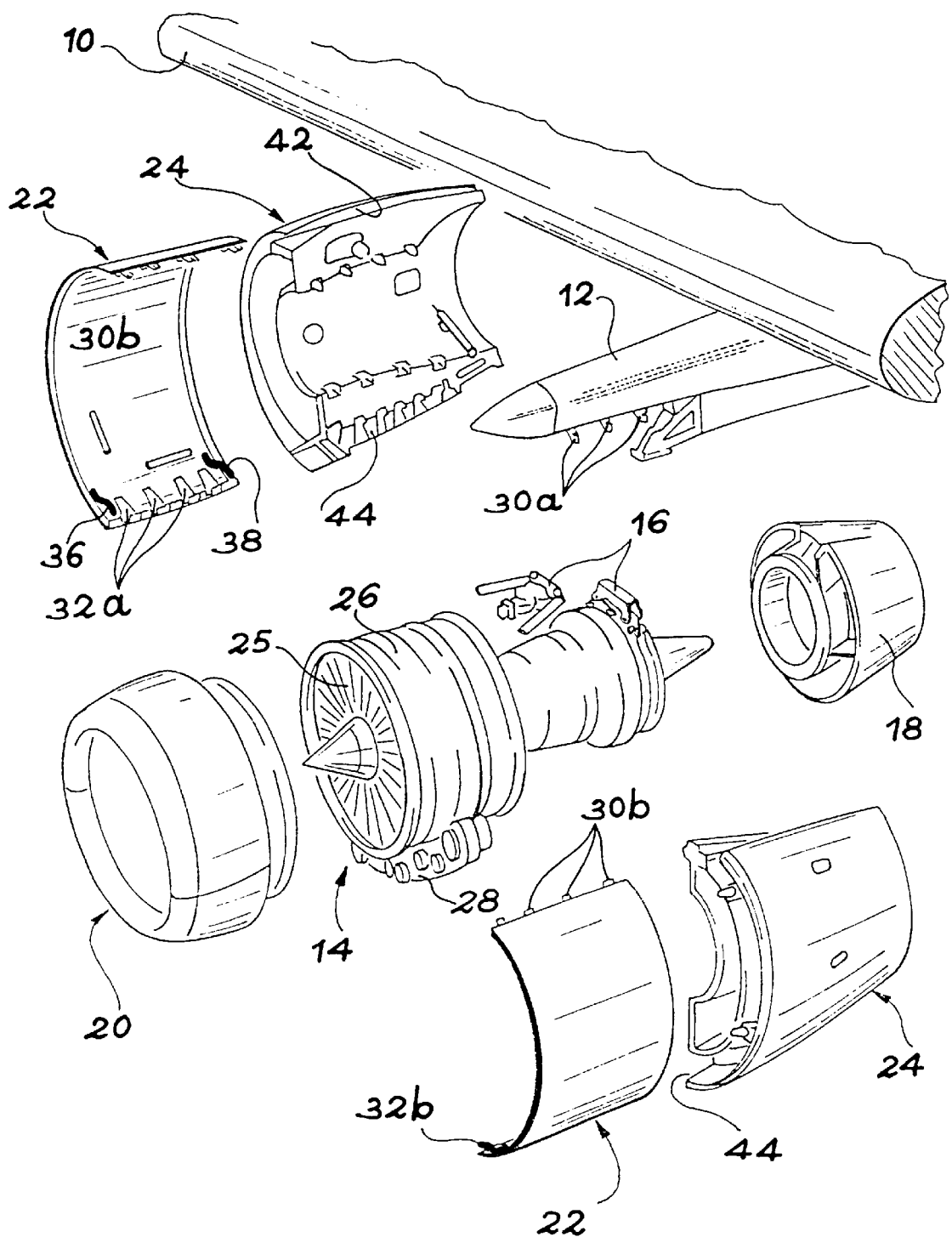
FIG. 5 an exploded perspective view showing a propulsion system according to the invention, fixed by its strut or pylon beneath an aircraft wing.

In FIG. 5, reference 10 designates an aircraft wing element. A propulsion system according to the invention, illustrated in exploded form, is suspended beneath said wing element 10 by a support strut or pylon 12.

The propulsion system comprises a centre or core engine 14, fixed beneath the strut 12 by fixing devices 16, in accordance with an arrangement well known in the art and which does not form part of the present invention. In its rear part, the centre engine 14 has a nozzle 18, shown separately here.

In its front part, the centre engine 14 has a fan 25. The fan 25 is surrounded by a fan case 26 joined to the fixed case of the engine 14 by not shown arms, which are radially oriented with respect to the longitudinal axis of the engine. The equipments 28 of the engine 14 are generally fixed to the fan case 26, below the latter.

A pod, whose various components are illustrated in exploded form in FIG. 5, is arranged coaxially around the centre engine 14 in a conventional arrangement. The longitudinal axis common to the engine 14 and to the pod consequently forms the propulsion system axis. Passing from front to rear, in the air flow direction when the aircraft is flying, the pod comprises an air intake structure 20, two cowls 22, known as "fan cowls" and a rear part, in this case formed by two cowls 24, known as "reversing cowls".

The air intake structure 20 is directly fixed to a fixed structure of the engine 14 by its rear end. This fixed structure is constituted by the fan case 26.

The fan cowls 22 have a substantially semicircular, C-shaped cross-section and are articulated to the strut 12 by their upper edges by means of hinge fittings 30a, 30b. Their closure is brought about by locking means 32a, 32b, which interconnect the lower edges of the cowls when said locking means are closed. As will be shown in greater detail hereinafter, the locking means are hooked locks, constituted by hooks 32a installed on one of the cowls 22 and forks 32b installed on the other cowl. When the fan cowls 22 are closed, they ensure the aerodynamic continuity of the external envelope of the air intake structure 20

Figure 6:
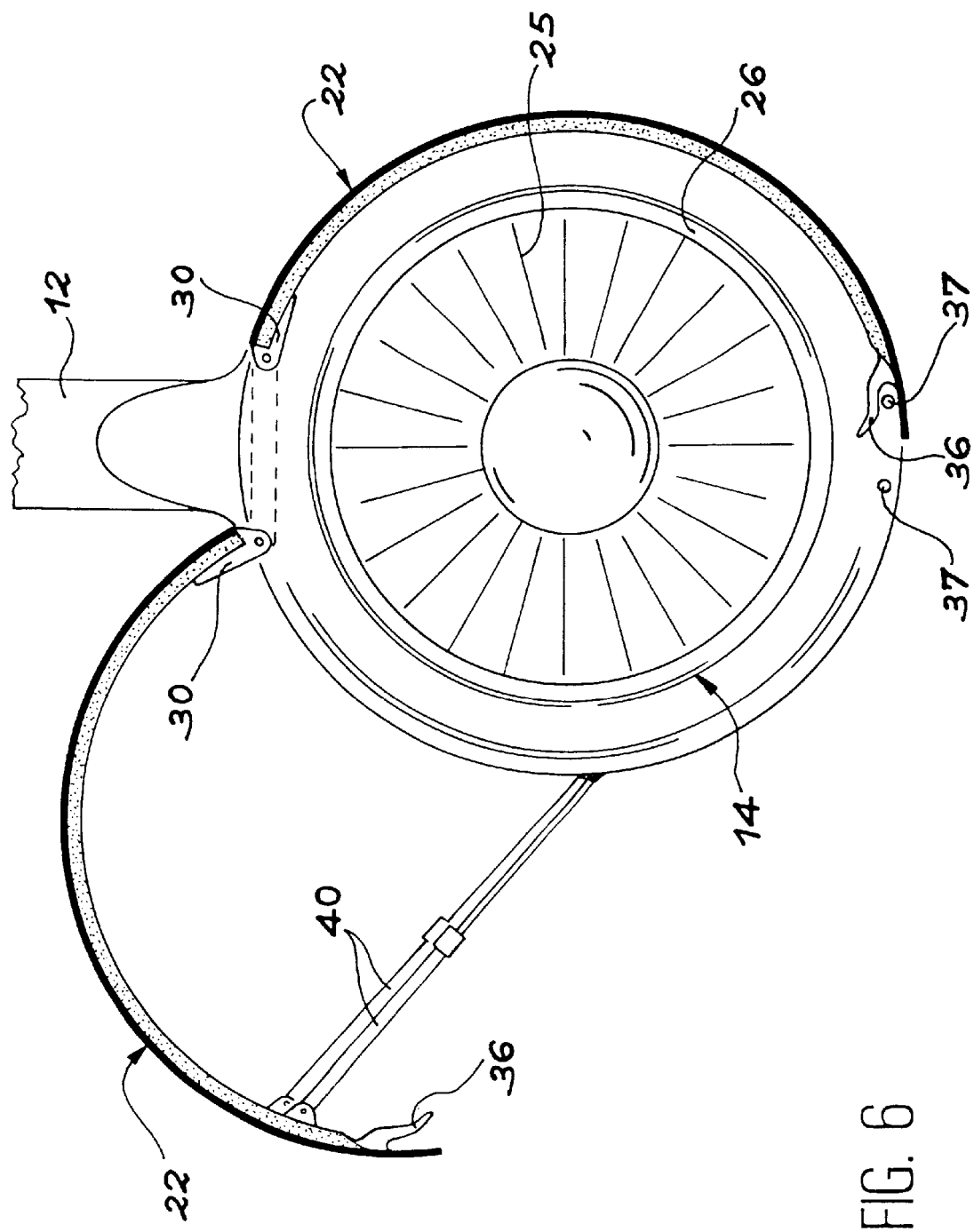
FIG. 6 a cross-section through the propulsion system of FIG. 5, in accordance with a plane passing through the cowls, the latter being respectively shown in their open and closed position to the left and right of the drawing.
Figure 10:
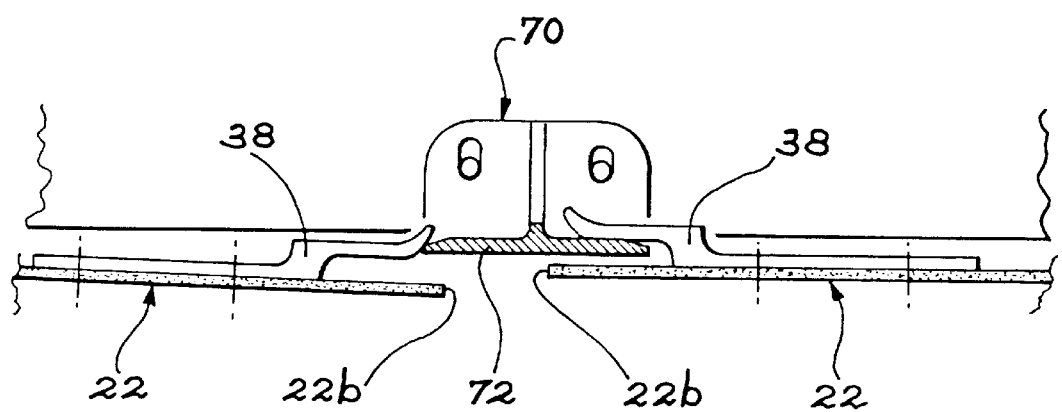
FIG. 10 a cross-sectional view, comparable to FIG. 7, but from front to rear, illustrating the rear guide means according to the invention.
Figure 11:
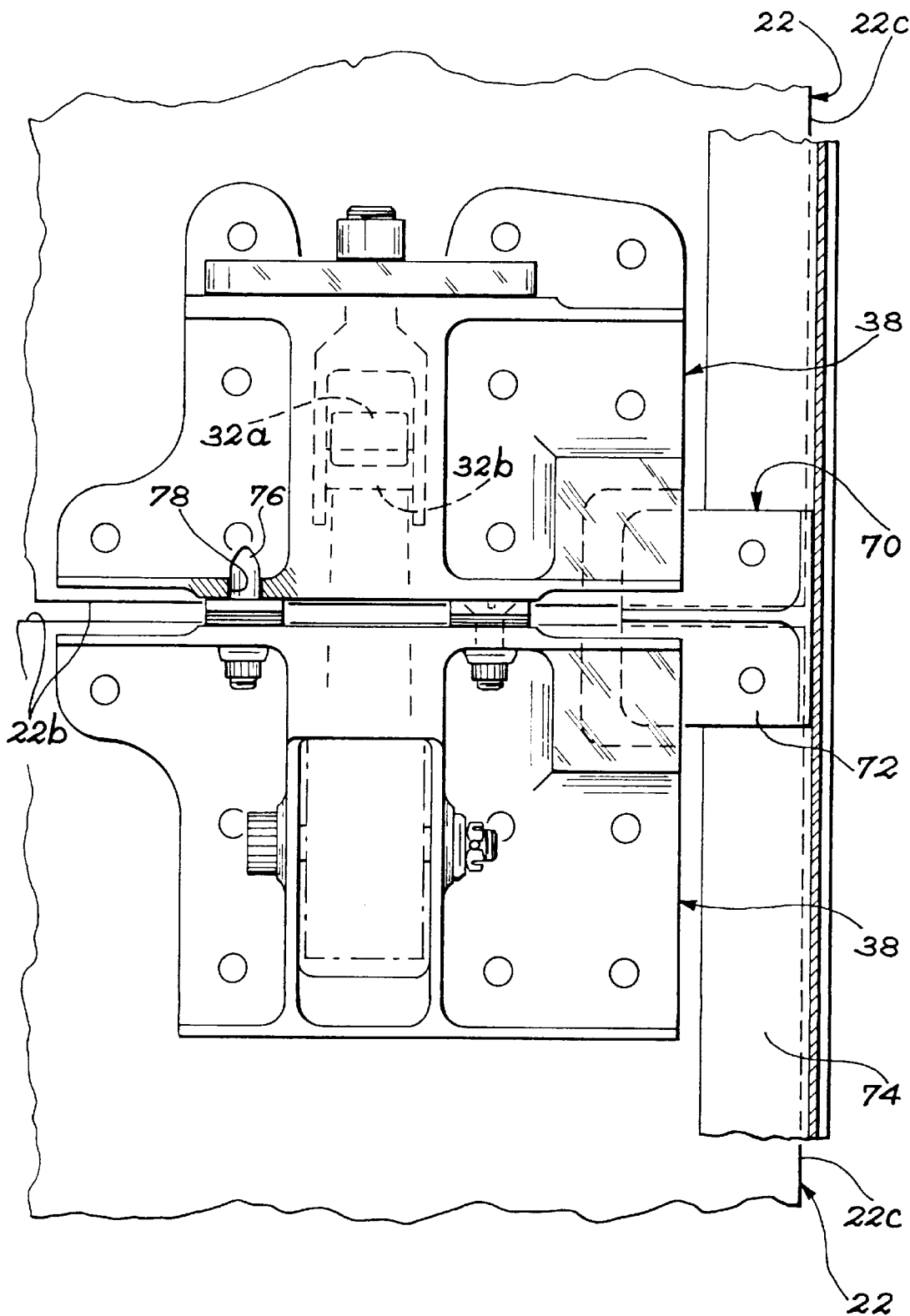
FIG. 11 a plan view showing the rear guide means of FIG. 10 and one of the hook locks.

According to the invention and as will be described hereinafter, said aerodynamic continuity is guaranteed by the presence of front guide means, with which are advantageously associated rear guide means. These front and rear guide means comprise a front guide 36 and a rear guide 38, fixed to each of the fan cowls 22, in the vicinity of their lower edges and respectively in the vicinity of their front and rear edges. The front and rear guide means also incorporate front thrust bearings 37 (FIG. 6) and rear thrust bearings 70 (FIGS. 10 and 11).

The opening of the locks formed by the hooks 32a and the forks 32b permits the upward pivoting of the cowls about the hinge fittings 30a, 30b. This makes it possible to maintain the equipments 28 of the engine 14. This upward pivoting of the cowls 22 is generally assisted by jacks 41, as shown to the left in FIG. 6.

The two reversing cowls 24, which constitute the rear part of the pod, are also articulated to the strut 12 by hinge fittings 42. Locks 44 also connect the lower edges of the reversing cowls 24, when the latter are closed.

As has been explained hereinbefore, when the fan cowls 22 are in the closed position, their front and rear edges normally surround the circular bearing surfaces of limited length and large diameter respectively formed at the rear of the air intake structure 20 and at the front of the rear part of the pod, here constituted by the reversing cowls 24.

The front and preferably rear guide means, according to the invention, ensure both on the ground and in the air, the application of circumferential loads generated by the closing of the locking means over the entire contour of these circular bearing surfaces. To this end, the front and rear guide means are interposed between the fan cowls 22 and parts carried by the engine 14, in the vicinity of the locking means 32a, 32b and the front and rear edges of the cowls.

More specifically, the front guide means are designed so as to oppose a relative displacement between the fan cowls 22 and the engine 14, both axially and radially with respect to the longitudinal axis of the latter, when the cowls 22 are in the closed position.

Moreover, when provided, the rear guide means oppose a relative displacement between the fan cowls 22 and the engine 14 (or reversing cowls 24), radially with respect to the longitudinal axis of the latter, when the cowls 22 are in the closed position.

A preferred embodiment of the front guide means will now be described in greater detail relative to FIGS. 7 to 9.

In this preferred embodiment of the invention and as has already been briefly described, the front guide means comprise a front guide 36 fixed to each of the fan cowls 22, and two front thrust bearings 37 fixed to the air intake structure 20. As a variant, the two thrust bearings 37 can be replaced by a single thrust bearing, without passing outside the scope of the invention.

Each of the front guides 33 is fixed to one of the fan cowls 22, in the vicinity of its front edge 22a and in the vicinity of its connecting edge 22b, i.e. its lower edge in the case of a propulsion system suspended beneath the wing.

Each of the front guides 36 has a shoulder 38, which is fixed within the corresponding cowl 22, e.g. by means of rivets traversing holes 40 provided for this purpose in the shoulder 38 and in the cowl 22.

Each of the front guides 36 also has a guide part 42, which extends the shoulder 38 towards the connecting edge 22b of the cowl 22, so as to be spaced from the latter, i.e. so that a space 44 is formed between the guide part 42 and the cowl 22. More specifically, the guide part 42 has a region adjoining the shoulder 38 and which extends towards the connecting edge 22b of the cowl 22 and substantially parallel to the latter, as well as an end region, which moves progressively away from the cowl, so as to form a guide ramp 46 on its face turned towards the cowl. Between these two regions of the guide part 42, the front guide 36 has a bulge 48, which extends the guide ramp 46 and defines a reduced thickness area of space 44.

Figure 8:
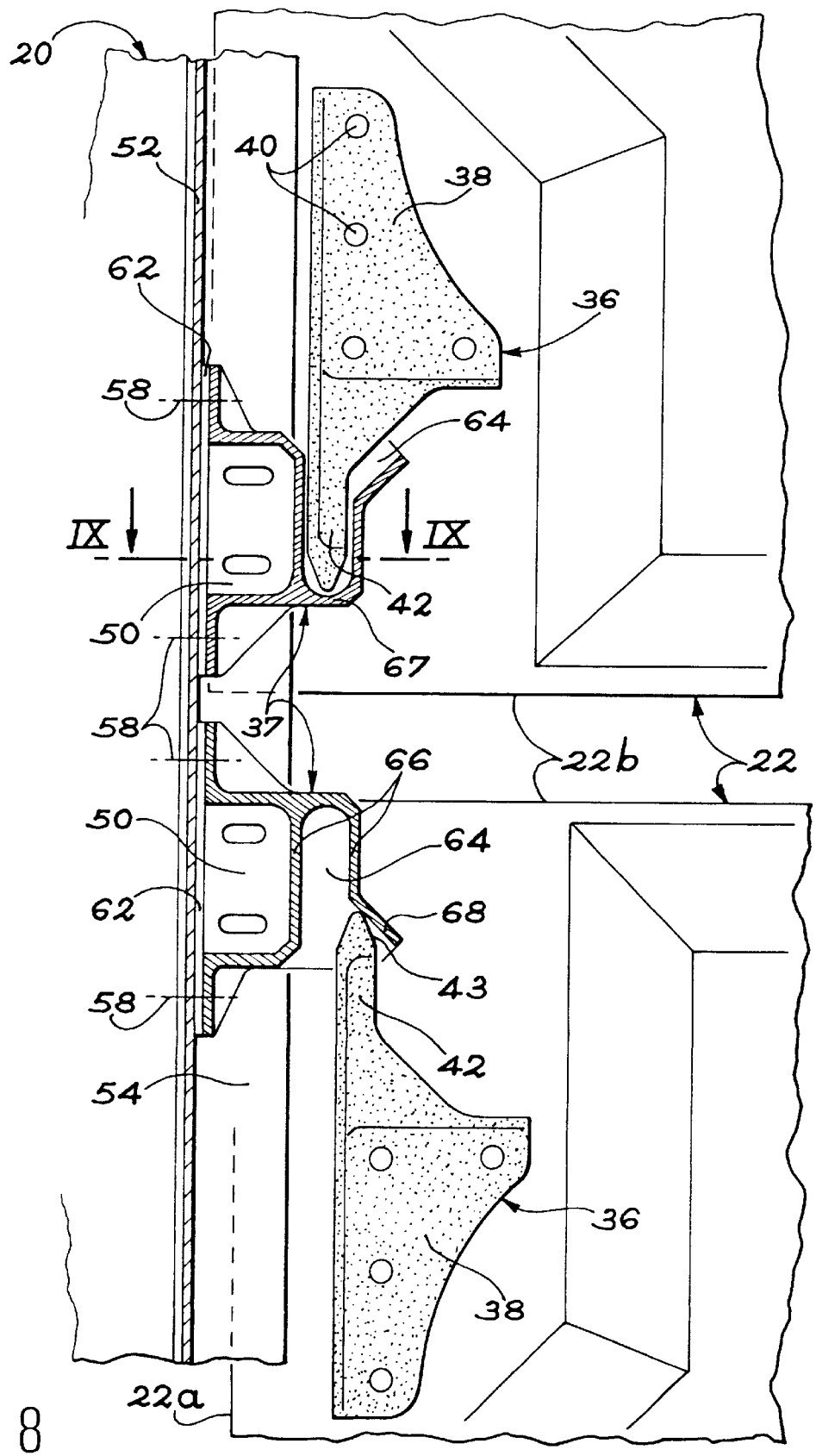
FIG. 8 a part sectional, plan view of the front guide means of FIG. 7, in the same positions of the cowls as in the latter.

In plan view and as illustrated in FIG. 8, the end region of the guide part 42 has a substantially uniform width, terminated by a bevelled portion 43.

Each of the front guides 37 has a base 50, by which it is fixed to the rear end of the air intake structure 20. More specifically, said rear end is materialized by a radial flange 52 turned towards the interior of the propulsion system and by a collar 54 projecting rearwards from the flange 52 and on which is formed the circular bearing surface 56. The base 50 of the front thrust bearing 37 is fixed both to the flange 52 and to the interior of the collar 54, e.g. using rivets 58.

Figure 7:
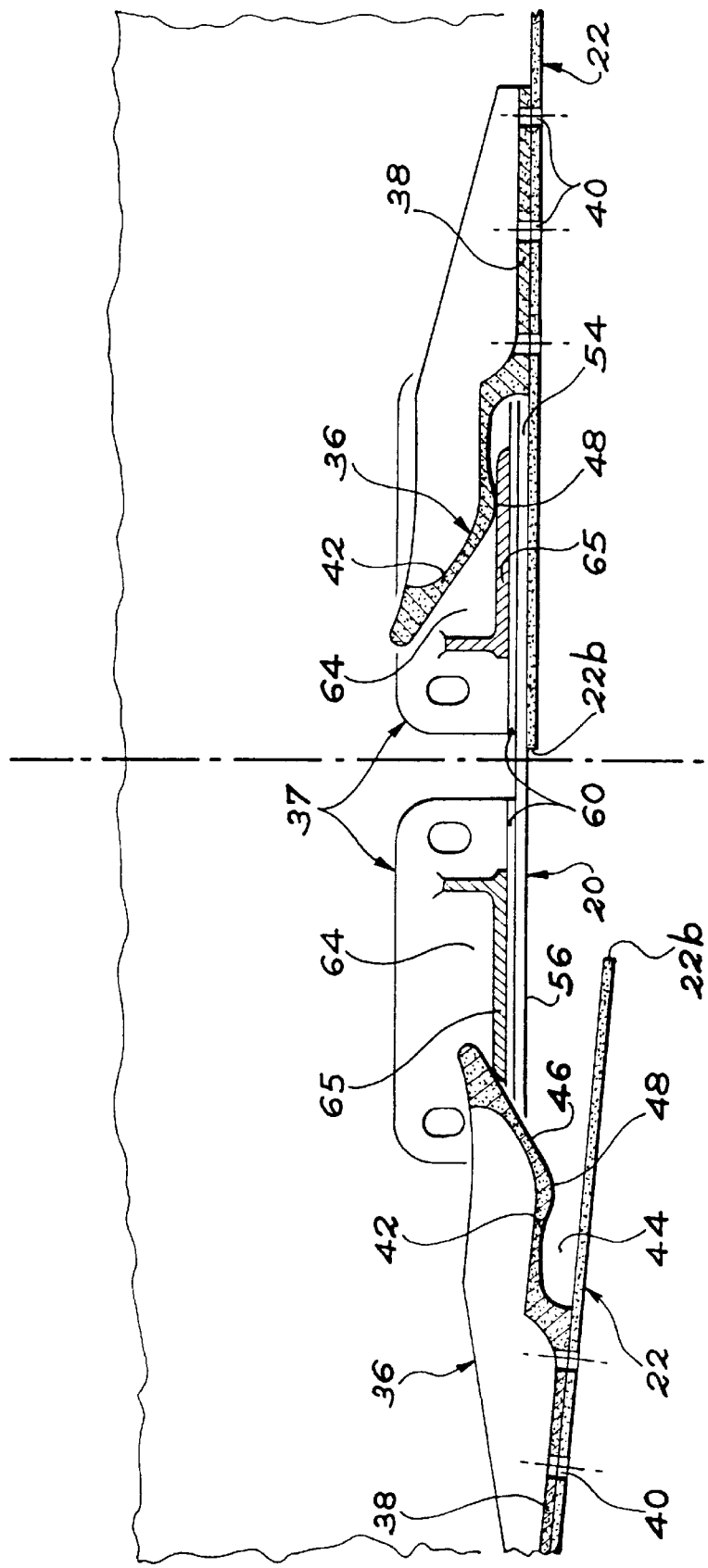
FIG. 7 a section along the section plane comparable to that of FIG. 6, which shows on a larger scale and viewed from rear to front, the front guide means according to the invention, respectively in the natural position and in the closed position of the cowls to the left and right of the drawing.
Figure 9:
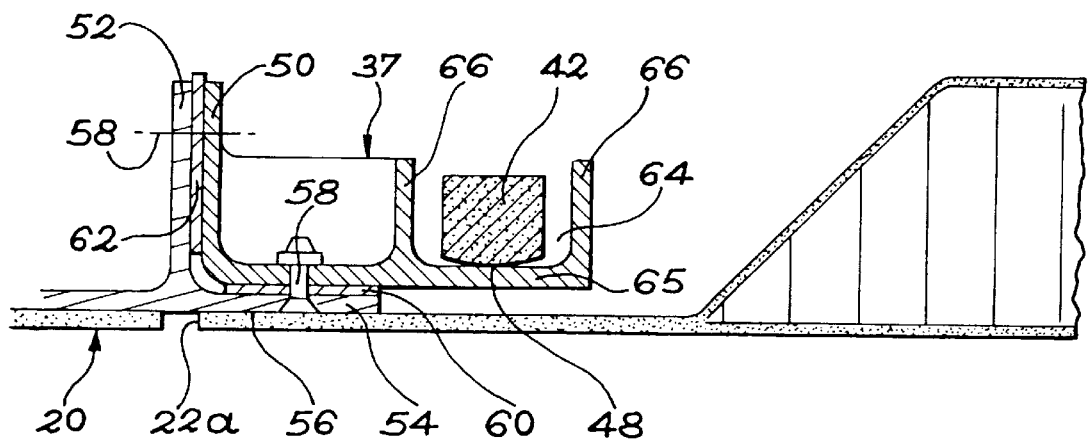
FIG. 9 a sectional view along line IX—IX of FIG. 8.

It should be noted that radial 60 and axial 62 adjusting shims can be advantageously interposed respectively between the base 50 and the collar 54 and between the base 50 and the flange 52, as illustrated by FIGS. 7 to 9. These adjusting shims make it possible to adjust the position of each of the front thrust bearings 37 with a high degree of precision during their installation.

Each of the front thrust bearings 37 has a receptacle 64 extending rearwards the base 50. This receptacle 64 has a hollowed out shape for receiving the end region of the guide portion 42 of the corresponding front guide 36. This receptacle 64 comprises a first partition 65, which extends the base 50 parallel to the collar 54, as well as two other partitions 66 extending towards the interior of the propulsion system and parallel to the flange 52, so as to give the receptacle 64 a U-shaped cross-section on the radial section of FIG. 9. As illustrated in FIG. 8, the three partitions 65, 66 are connected by a bottom 67 to the end of the receptacle 64 closest to the median vertical plane of the propulsion system. In addition, at its end opposed to said bottom 64, the partition 66 furthest removed from the base 50 moves away progressively from the latter, in order to form a ramp 68.

As illustrated to the left of FIG. 7, the relative arrangement between the front thrust bearings 37 and front guides 36 is such that, under the effect of the weight of the cowl 22, the end region of the guide part 42 normally bears, by its guide ramp 46, against the edge of the partition 65 materializing the open end of the corresponding receptacle 64. The front guides 36 are then slightly rearwardly displaced with respect to the bottom of said receptacle 64, as is illustrated at the bottom of FIG. 8. The bevelled portion 43 then bears on the ramp 68.

This natural bearing position differs sufficiently from the closed position of the cowls, illustrated to the right in FIG. 7 and at the top of FIG. 8, to enable operators carrying out maintenance to easily detect the absence of closure of the locks by simply visually checking the spacing of the edges 22b of the cowls.

In the fan cowl 22 closure position, illustrated to the right in FIG. 7 and top in FIG. 8, the guide parts 42 of the front guides 36 penetrate the receptacles 64 of the front thrust bearings 37, so that the partitions 65 of the receptacles are in friction contact with bosses 48 of the guide part. A relative maintenance between the lower ends of the cowls 22 and the air intake structure 20 is consequently ensured both in the radial direction and in the axial direction with respect to the longitudinal axis of the propulsion system.

The passage of the cowls 22 from their natural bearing position into their closed position is guided both by the cooperation of the ramp 46 with the edge of the partition 65 and by the cooperation of the bevelled portion 43 with the ramp 68. In practice, this passage requires the application of a circumferential force between the cowls 22 by 25 locking means 32a, 32b for interconnecting the same. Thus, the passage of the cowls 22 into their closed position implies the use of locking means 32a, 32b.

It should be noted that the front guide means described hereinbefore are automatically active when the two cowls 22 are interconnected by the locking means 32a, 32b. These front guide means also leave free the evolution of the circumferential clearance between the two fan cowls 22.

A more detailed description will now be given with reference to FIGS. 10 and 11 of the rear guide means, which are preferably provided between the fan cowls 22 and the rear part of the pod.

As has already been briefly described, these rear guide means comprise a rear guide 38, fixed to each of the cowls 22, as well as a rear thrust bearing 70, fixed either to the fan collar 26, or to the rear part of the pod, materialized by the reversing cowls 24.

The rear guides 38 are fixed to the fan cowls 22, in the vicinity of their rear edges and in the vicinity of the locking means 32a, 32b. As illustrated in FIG. 10, they have in radial section a configuration substantially identical to that of the front guides 36. However, in plan view, their shape is significantly different, as is apparent by a comparison of FIGS. 8 and 11. This difference is explained by the fact that the rear guide means only have the function of opposing a radial displacement of the cowls 22 with respect to the longitudinal axis of the propulsion system, when the cowls are closed. Thus, the axial maintenance ensured by the front guide means is adequate to isostatically maintain the cowls.

Moreover, the front thrust bearing 70 has a wall 72 parallel to the collar 74 forming the circular bearing surface to which is applied the rear edges of the cowls 22, in their closed position.

In the natural bearing state of the cowls 22, illustrated to the left of FIG. 10, the rear guides 38 bear against the circumferential ends of the wall 72, so that the spacing of the lower edges from the cowls 22 is also ensured to the rear of the latter, despite their natural flexibility.

However, when the cowls are brought into the closed position by actuating the locking means, the guide parts of the rear guides 38 bear on the face of the wall 72 turned towards the interior of the propulsion system. The radial maintenance of the cowls in the bottom of their rear part is consequently also ensured.

In the closed position of the fan cowls 22, a centring pin 76, connected to one of the cowls, enters a hole 78 formed in the other cowl. This ensures a relative position between the lower edges 22b of the cowls 22.

As illustrated in FIG. 11, the rear guides 38 can form part of members for supporting the hook 32a and fork 32b of the hooked lock closest to the rear edges 22c and to the cowls 22.

What is claimed is:

1. An aircraft propulsion system, comprising;
    an engine;
    a pod placed around the engine in accordance with a common longitudinal axis; and
    a strut supporting said engine, said pod further including an air intake structure and two cowls having a C-shaped cross-section, articulated to said strut and adapted to be connected to one another by locking means, in a closed position of said cowls wherein front guide means are interposed between said cowls and a member carried by said engine in the vicinity of said locking means and a front edge of said cowls, so as to oppose a relative displacement between said cowls and said engine, both in a first direction parallel to said longitudinal axis and in a second direction perpendicular to said axis, independently of said locking means, when said cowls are in a closed position.

2. The propulsion system according to claim 1, wherein said front guide means comprise at least one front thrust bearing fixed to said member and a front guide fixed to each of said cowls, each said front guide automatically cooperating with said front thrust bearing when the cowls are in the closed position.

3. The propulsion system according to claim 2, wherein said front guide means comprise two front thrust bearings fixed to said member, each front guide cooperating with one of said thrust bearings when the cowls are in the closed position.

4. The propulsion system according to claim 2, wherein said front guide means comprise a single front thrust bearing fixed to said member.

5. The propulsion system according to claim 2, wherein said front thrust bearing is fixed to a circular collar and to a radial flange materializing a rear end of the air intake structure of the pod.

6. The propulsion system according to claim 5, wherein radial adjusting shims interposed between said front thrust bearing and said circular collar and said axial adjusting shims are interposed between said front thrust bearing and said radial flange.

7. The propulsion system according to claim 2, wherein when said locking means are not locked, said front guide means maintain said cowls in a natural position, differing significantly compared with a closed position, in which adjacent edges of said cowls are visibly spaced from one another.

8. The propulsion system according to claim 7, wherein the natural position of said cowls is defined by a contact between each front guide and said front thrust bearing, under the action of gravity forces. whereby a displacement of said cowls from a natural position to the closed position requires the application of a further circumferential force between said cowls by said locking means.

9. The propulsion system according to claim 1, wherein said rear guide means are interposed between said cowls and a second member carried by the engine or by a rear part of the pod, in the vicinity of said locking means and a rear edge of said cowls, so as to oppose a relative displacement between said cowls and said engine, in a radial direction with respect to a longitudinal axis, when said cowls are in the closed position.

10. The propulsion system according to claim 9, wherein said rear guide means incorporate a rear thrust bearing, integral with said second member, and a rear guide integral with each of said cowls, each rear guide automatically cooperating with said rear thrust bearing when said locking means are in the closed position.

11. The propulsion system according to claim 10, wherein said rear thrust bearing is fixed to reversing cowls materializing in the rear part of said pod.

12. The propulsion system according to claim 10, wherein said rear thrust bearing is fixed to a fan collar of said engine.

13. An aircraft propulsion system, comprising:
   an engine; and
   a pod placed around said engine in accordance with a common longitudinal axis, said pod further comprising an air intake structure having at least two cowls having a C-shaped cross-section, wherein said cowls articulated to a strut and adapted to be connected to one another by a locking means, in a closed position of said cowls, wherein a front guide means interposed between said cowls and a part carried by said air intake structure of said pod, in the vicinity of said locking means and a front edge of said cowls, so as to oppose a relative displacement between said cowls and said engine, in any axial direction and in any radial direction with respect to said longitudinal axis, when said cowls are in said closed position.

* * * * *